(12) United States Patent
Wilson et al.

(10) Patent No.: US 11,714,581 B1
(45) Date of Patent: Aug. 1, 2023

(54) SYSTEM AND METHOD FOR AUTOMATED DEVICE ONBOARDING TO A CLOUD BASED PRINTING SYSTEM

(71) Applicant: Toshiba TEC Kabushiki Kaisha, Shinagawa-ku (JP)

(72) Inventors: Silvy Wilson, Rancho Santa Margarita, CA (US); Marianne Kodimer, Huntington Beach, CA (US); Gouse Shaik, Lake Forest, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 17/940,782

(22) Filed: Sep. 8, 2022

(51) Int. Cl.
*G06F 3/12* (2006.01)
*H04N 1/00* (2006.01)
*H04W 12/71* (2021.01)

(52) U.S. Cl.
CPC .......... *G06F 3/1204* (2013.01); *G06F 3/1226* (2013.01); *G06F 3/1238* (2013.01); *G06F 3/1254* (2013.01); *G06F 3/1288* (2013.01); *H04N 1/00363* (2013.01); *H04W 12/71* (2021.01)

(58) Field of Classification Search
None
See application file for complete search history.

(56) References Cited

U.S. PATENT DOCUMENTS

| | | | |
|---|---|---|---|
| 9,525,678 B2* | 12/2016 | Mori | H04N 1/4413 |
| 2014/0002840 A1* | 1/2014 | Takano | G06F 3/1201 |
| | | | 358/1.13 |
| 2018/0212950 A1* | 7/2018 | Nogawa | H04N 1/00244 |
| 2019/0050170 A1* | 2/2019 | Ren | G06F 3/1288 |
| 2021/0029269 A1* | 1/2021 | Nakamura | H04W 8/005 |

* cited by examiner

*Primary Examiner* — Haris Sabah
(74) *Attorney, Agent, or Firm* — Ulmer & Berne LLP; John X. Garred

(57) ABSTRACT

In a system and method for automated device onboarding to a cloud based printing system, and administrator logs in to a selected one of a group of networked multifunction peripherals and registers it to a company in accordance with a device registration code. The selected multifunction peripheral registers itself with a cloud server, and discovers other candidate multifunction peripherals for registration. The selected multifunction peripheral sends the device registration code to each discovered multifunction peripheral with an instruction to perform self-registration with the cloud server. Each discovered multifunction peripheral then registers with the cloud server. A registered user may send a document processing job to the cloud server and release from any registered multifunction peripheral.

20 Claims, 5 Drawing Sheets

SYSTEM AND METHOD FOR AUTOMATED DEVICE ONBOARDING TO A CLOUD BASED PRINTING SYSTEM

TECHNICAL FIELD OF THE INVENTION

This application relates generally to printing. The application relates more particularly to automated registration of multifunction peripherals with a cloud based printing system.

BACKGROUND OF THE INVENTION

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Businesses or schools may have one or more MFPs available for use by their employees or students. Users will typically send a document processing job, such as a print job, to an MFP of their choice. They would then go to their selected MFP and pick up their printout. A user may also approach an MFP with their print job in portable data storage, such as on their smart device or portable memory device, transfer the electronic document to the MFP and obtain their print out. More recently, cloud based printing allows registered users to upload their print job to a cloud server. They can then proceed to any MFP commonly registered to print their job from the cloud.

BRIEF DESCRIPTION OF THE DRAWINGS

Various embodiments will become better understood with regard to the following description, appended claims and accompanying drawings wherein:

DETAILED DESCRIPTION OF THE INVENTION

Figure 1:
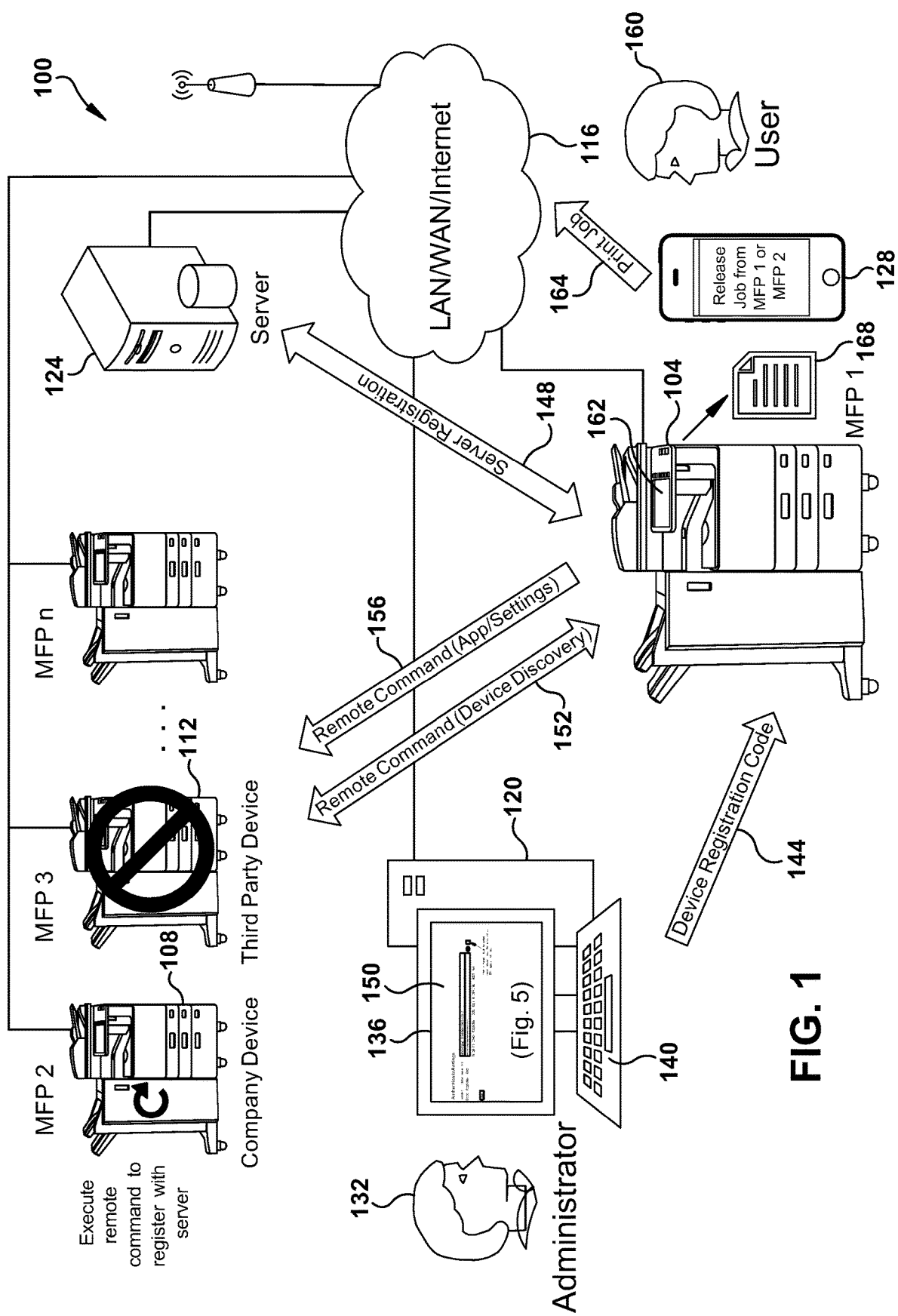
FIG. 1 an example embodiment of a system for automated device onboarding to a cloud based printing system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Example embodiments include products supplied by Toshiba TEC. However, it is to be appreciated that any suitable cloud printing system may be used. Toshiba TEC's e-BRIDGE Global Print (eGP) provides an example of a cloud-based print system where registered users can print to the cloud and release their print jobs from any MFP that is also registered with the system. eGP allows companies to auto-register their devices instead of having to manually add them to the system. MFPs are required to identify themselves as belonging to a company during auto-registration with eGP. In addition, prevention of random devices from registering as MFPs in the eGP server may be accomplished by the eGP client on the MFP (eApp) providing a device registration code (unique to each company) at the time of registration. The device registration code is generated by a company's administrator or admin and may be set on an MFP through a web application such as Toshiba TEC's Top Access running on Toshiba MFPs. However, if a company owns/leases hundreds of devices, it is time consuming to update all the MFPs with the device registration code. One possible way to alleviate the burden on the admin is to clone the setting on all the devices once it is correctly set on one MFP. However, this would still require significant manual work by the company's admin.

Example embodiments herein provide a different way to solve the problem of multiple device registration by using remote command mechanism installed on an MFP. Once a setting, such as the eGP-eApp setting 'Device Registration Code' (marked as cloneable or sync) is updated on an MFP, the MFP discovers all compatible company devices in the network and sends the new setting to all the discovered devices in the network as a remote command. The receiving MFP then updates the correct information such as via an eApp setting based on instructions disposed in the remote command. This saves an admin user from having to create clones and update other devices. Updating of settings, along with registration, is a choice given to the admin has a choice as to whether settings should be updated during registration.

Accordingly, example embodiments herein provide a system for automatically registering devices in a fleet with a cloud-based system based on a single device registration code. The system can also automatically sync setting values with other devices on the network when settings are updated on one device. A central service may send and handle remote command calls from any eApp. The service may suitably ignore any commands that are unrelated to apps installed on the MFP.

Further example embodiments provide a user interface (UI) for a user to enter a single device registration code and optionally configure a synchronized device update.

In example embodiments herein, a device registration code needs to be set on each MFP for cloud registration. This code identifies the company that the device belongs to and prevents just any device from registering. The device registration code may be set, such as by being set on app settings of the eGP client eApp that resides on a Toshiba TEC MFP. The app settings are exposed through the TopAccess Web Application on each MFP. The code may be generated by a company admin. Since it is time consuming to update each MFP with the code, one may set the value on one MFP, clone the settings and then apply the clone file to all other MFPs. This would still require an admin to create the clone file, and then import it into each MFP.

Example embodiments herein utilize an MFP remote command mechanism. The admin generates the device registration code for the company and sets it on one device, such as through the eApp home setting exposed on Top Access.

The eApp receives the setting and uses it to register with the eGP server. Once the registration is successful, the eApp (or a central service) does a device discovery to get the list of compatible company devices on the network. This is suitably accomplished via an SNMP discovery library or any other suitable network device discovery system. The eApp (or a central service) then sends remote commands that contain instructions as to what app and what settings. The receiving MFP processes it like any other remote command. The admin can decide whether settings are to additionally be cloned.

Such registration may be extended to any suitable app settings on the MFP and to provide an efficient way to sync settings across devices on the network. Once the receiving MFP sets the eApp setting in the remote command, registers with the eGP server. The receiving service on the MFP is suitably enabled to set any setting on any eApp and reject any settings that are not associated with the installed eApps.

FIG. 1 illustrates an example embodiment of a system 100 for automated device onboarding to a cloud based printing system. One or more MFPs, such as MFPs 104, 108 and 112, are in data communication via network cloud 116. Network cloud 116 is suitably comprised of a local area network (LAN), a wide area network (WAN), which may comprise the Internet, or any suitable combination thereof. Network cloud 116 is comprised of any suitable wireless or wired data connection or combination thereof. Also in data communication with network cloud 116 are more digital devices, such as administrator terminal 120, server 124, suitably a cloud based server, and user devices such as user smartphone 128.

Administrator or admin user 132 suitably interfaces with a selected MFP, such as MFP 104, via administrator terminal 120, which in the example includes a user interface including display 136 and user input keyboard 140. Admin user 132 sends a desired device registration code 144 to MFP 104 which proceeds to registration 148 with server 124, suitably by user interface display 150, detailed further in connection with FIG. 5, below. Once registered, MFP 104 undertakes device discovery for compatible company devices on network cloud 116. In the illustrated example, MFP 108 is deemed appropriate for registration, while MFP 112, a third party device, is not. Each identified, compatible MFP is provided remote command 152 to initiate device discovery and with remote command 156 that includes, in addition to device registration code 144, a remote registration command, and settings which may be synced at the discretion of admin user 132.

Once one or more MFPs are registered, a compatibly registered user, such as user 160 of smartphone 128 may send a document processing job, such as print job 164, to server 124. User 160 may then go to MFP 104, MFP 108, or any other commonly registered MFP, and release their print job from an MFP, such as via an MFP touchscreen user interface of from an interface on their data device. In the illustrated example, user 160 enters their login credentials to MFP 104, suitably via touchscreen 162 or via smartphone 128. An electronic document comprising print job 164 is retrieved by MFP 104 from server 124 and rendered as tangible document 168.

Figure 2:
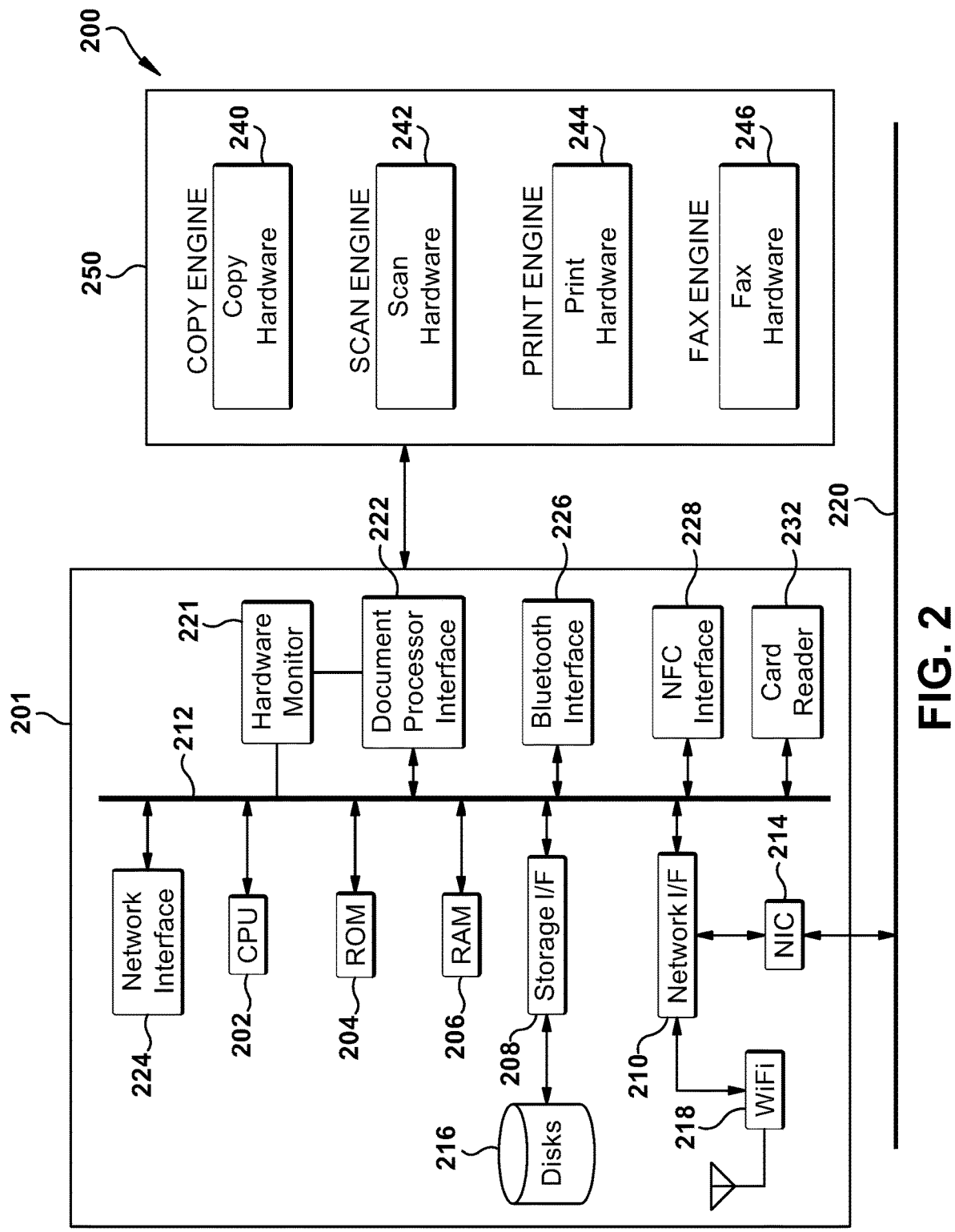
FIG. 2 is an example embodiment of a networked digital device, such as multifunction peripheral.

Turning now to FIG. 2, illustrated is an example embodiment of a networked digital device comprised of document rendering system 200 suitably comprised within an MFP, such as with MFPs 104, 108 and 112 of FIG. 1. It will be appreciated that an MFP includes an intelligent controller 201 which is itself a computer system. Thus, an MFP can itself function as a server with the capabilities described herein. Included in intelligent controller 201 are one or more processors, such as that illustrated by processor (CPU) 202. Each processor is suitably associated with non-volatile memory, such as read-only memory (ROM) 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with additional interfaces, such as Bluetooth interface 226, NFC interface 228 and card reader 232 for data exchange with proximity cards, such as card keys.

Processor 202 is also in data communication with a network interface 210 which provides an interface to a network interface controller (NIC) 214, which in turn provides a data path to any suitable wired interface or physical network connection 220, or to a wireless data connection via wireless network interface 218. Example wireless network interfaces include optical, cellular, Wi-Fi, wireless universal serial bus (wireless USB), satellite, and the like. Example wired interfaces include Ethernet, USB, IEEE 1394 (FireWire), Lightning, telephone line, or the like.

Processor 202 can also be in data communication with any suitable user input/output (I/O) network interface 222 which provides data communication for interfacing with user peripherals, such as displays, keyboards, mice, track balls, touch screens, or the like. Processor 202 can also be in communication with hardware monitor 221, such as a page counter, temperature sensor, toner or ink level sensor, paper level sensor, or the like.

Also in data communication with data bus 212 is a document processor interface 222 suitable for data communication with the document rendering system 250, including MFP functional units. In the illustrated example, these units include a copy engine comprising copy hardware 240, a scan engine comprise of scan hardware 242, a print engine comprised of print hardware 244 and a fax engine comprised of fax hardware 246 which together comprise document rendering system 250. It will be understood that functional units are suitably comprised of intelligent units, including any suitable hardware or software platform.

Figure 3:
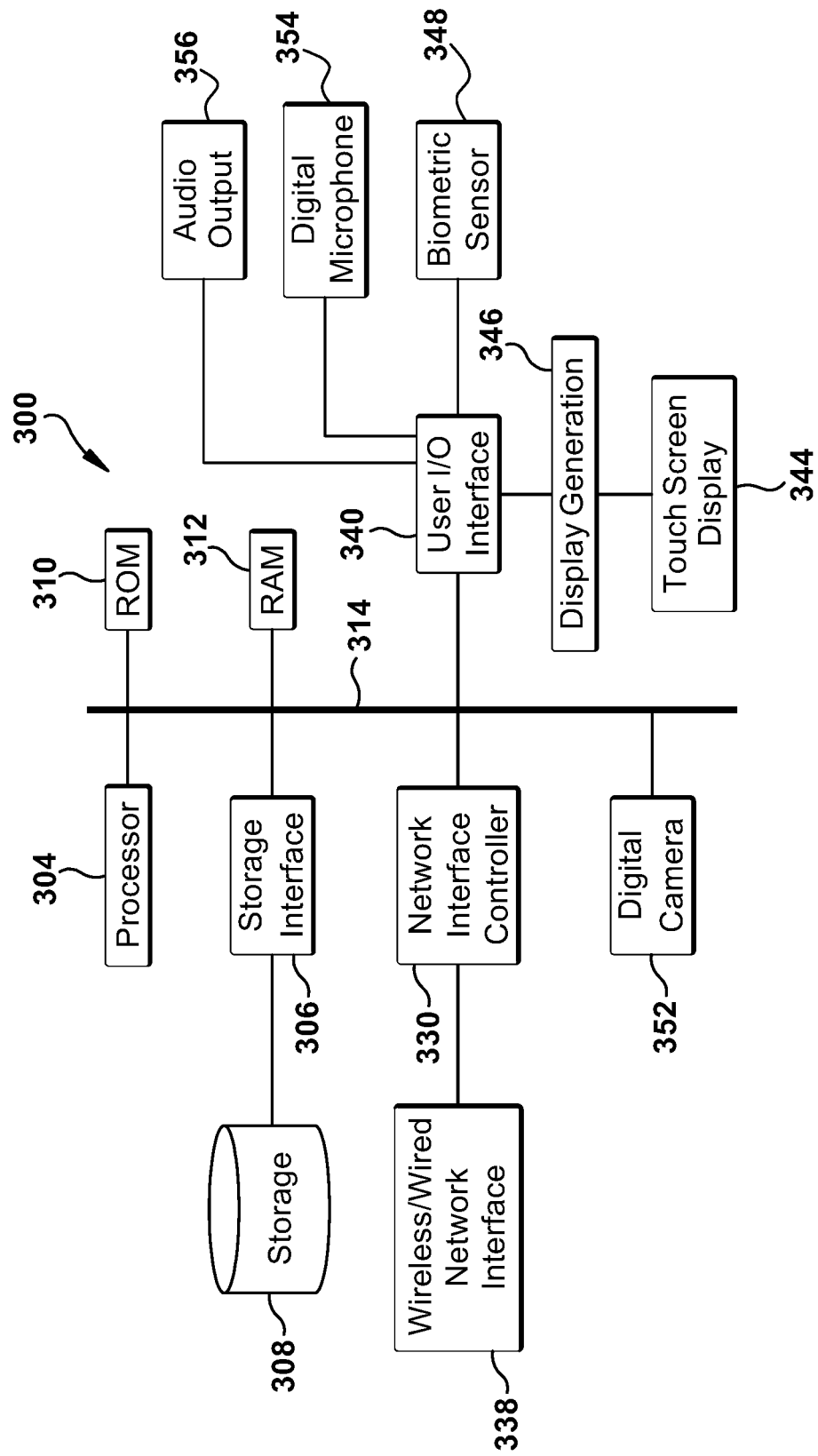
FIG. 3 is an example embodiment of a digital device system.

Turning now to FIG. 3, illustrated is an example embodiment of a digital data device 300 such as administrator terminal 120, server 124 or smartphone 128 of FIG. 1. It is to be appreciated that some components listed may be unnecessary in certain configurations. Components of the digital data processing device 300 suitably include one or more processors, illustrated by processor 304, memory, suitably comprised of read-only memory 310 and random access memory 312, and bulk or other non-volatile storage 308, suitably connected via a storage interface 306. Data communication among components is accomplished via data bus 314. A network interface controller 330 suitably provides a gateway for data communication with other devices, via any wireless or wired connection, such as via wireless network interface 338. A user input/output interface 340 is suitably comprised of display generator 346 interfacing with touchscreen display 344. As noted above, any suitable user input and display can be used. User input/output interface 340 also provides connection to biometric sensor 348, suitably comprised of a fingerprint sensor, retinal sensor, or the like, and may be used to secure device access to one or more users. Processor 304 is also in data communication with a digital camera 352, suitably used to capture images which may include encoded images such as barcodes or QR codes. Digital camera 352 is also suitably used for facial recognition, including facial recognition for securing device access. Processor 304 processor is also in data communication with a digital microphone 354 and audio output 356 via interface 340.

Figure 4:
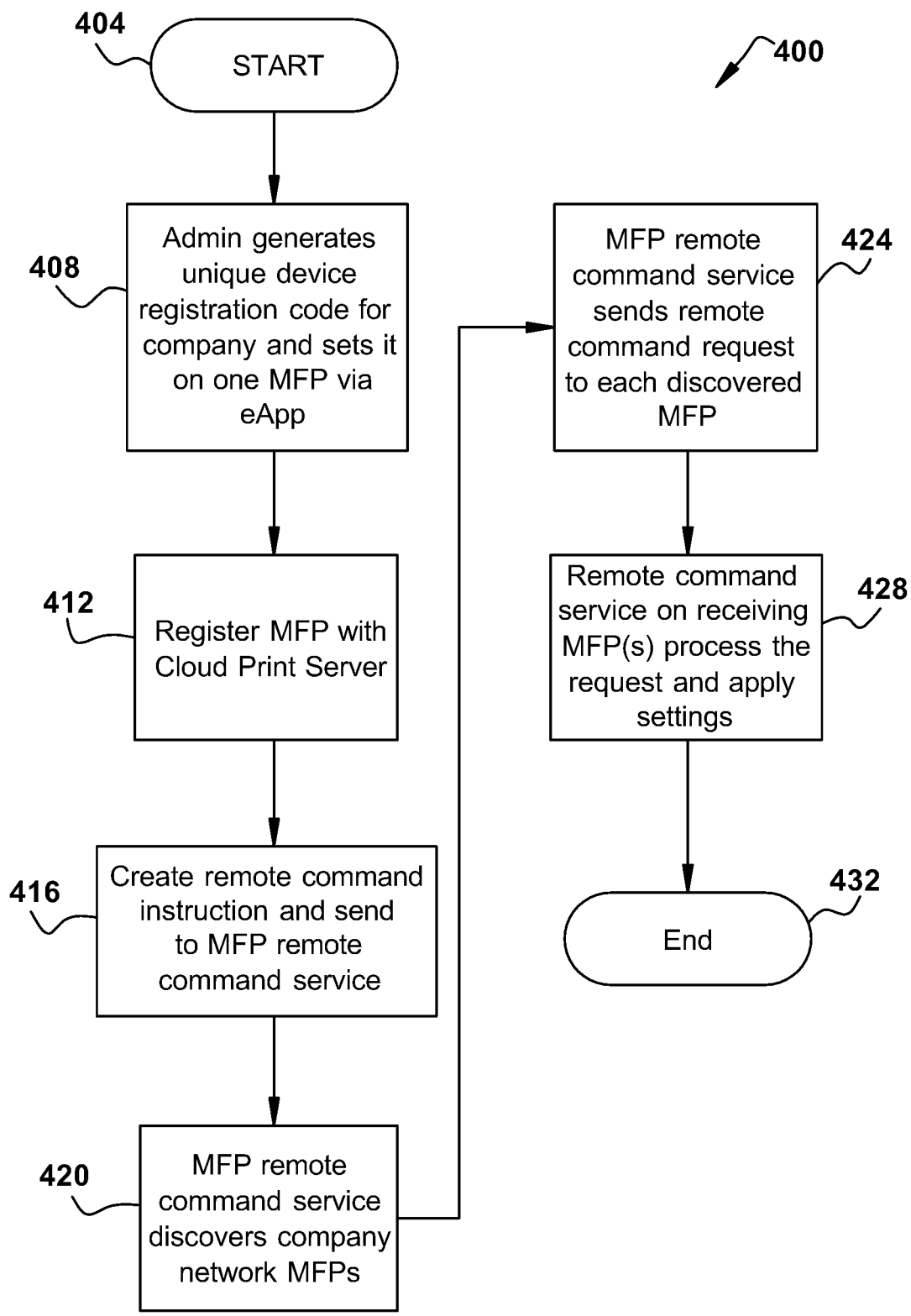
FIG. 4 is an example embodiment of a flowchart for automated device onboarding to a cloud based printing system.

FIG. 4 illustrates an example embodiment of a flowchart 400 for automated device onboarding to a cloud based printing system. The process commences at block 404 and proceeds to block 408 where an admin generates a unique registration code for their company and sends it a selected MFP on their network, suitably by an MFP eApp. The selected MFP, in accordance with a received instruction and registration code, proceeds to register itself with a cloud print server at block 412. The selected MFP then creates a remote command instruction which is sent to an associated remote command service at block 416. The remote command service then discovers networked company MFPs at block 420. The MFP remote command service then sends a remote command request to each discovered MFP at block 424. Each discovered MFP receives the remote request, along with the device registration code, and proceeds to automatically register with the cloud server at block 428. If instructed by the admin, device settings may also be synced. The process ends at block 432.

Figure 5:
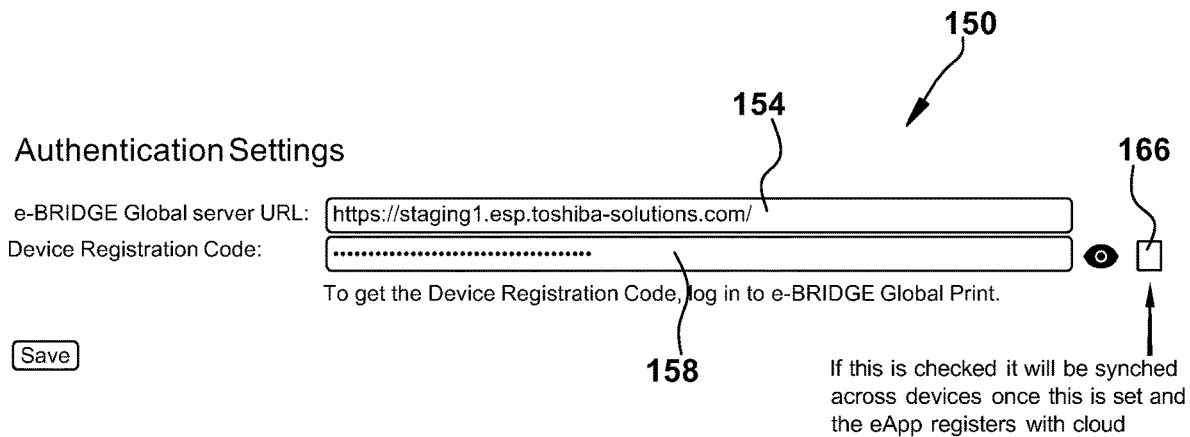
FIG. 5 is an example embodiment of an administrator user interface.

FIG. 5 illustrates an example embodiment of an admin user interface such as user interface display 150 of FIG. 1. The admin specifies a cloud server address at text entry block 154, and a device registration code at text entry block 158. If the admin wishes to also sync devices at registration, the select box 166 can be selected. Such information is then sent to be discovered by networked devices as detailed above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
   a processor;
   a memory;
   a data interface;
   the processor configured to receive a device registration code from an associated user via the data interface;
   the processor further configured to register the multifunction peripheral with an associated print service, via the data interface, in accordance with the received device registration code;
   the processor further configured to generate a remote command instruction;
   the processor further configured to communicate a generated remote command instruction to a remote command service;
   the processor further configured discover one or more networked multifunction peripherals via the data interface in accordance with the remote command service and the remote command instruction; and
   the processor further configured to communicate, via the data interface, a remote command request to each discovered multifunction peripheral, the remote command request including the received device registration code and an instruction for autonomous device registration with a print service.

2. The multifunction peripheral of claim 1 wherein the data interface includes a network interface and a user interface, and wherein the processor is further configured to
   receive a print release from a user registered in accordance the registration code via the user interface,
   retrieve a print job associated with the user associated with the registered user, and
   generate a printout of the print job via associated print engine.

3. The multifunction peripheral of claim 2 wherein the device registration code is uniquely assigned to a business entity such that the user, the multifunction peripheral and each discovered multifunction peripheral are registered to the business entity.

4. The multifunction peripheral of claim 3 wherein the print service is comprised of one or more cloud servers.

5. The multifunction peripheral of claim 4 wherein the processor is further configured synchronize setting values with each of the discovered multifunction peripherals responsive to the remote command request.

6. The multifunction peripheral of claim 5 wherein the remote command request includes instructions for device configuration, and wherein the processor is further configured to
   receive device configuration data via the data interface,
   configure the multifunction peripheral in accordance with received device configuration data, and
   communicate received device configuration data to each discovered multifunction peripheral.

7. The multifunction peripheral of claim 6 wherein the processor is further configured selectively communicate the received device configuration data to each discovered multifunction peripheral in accordance with an administrator instruction received from an associated administrator via the data interface.

8. A method implement by a processor of a multifunction peripheral comprising:
   receiving a device registration code from an associated user via a data interface;
   registering the multifunction peripheral with an associated print service, via the data interface, in accordance with the received device registration code;
   generating a remote command instruction;
   communicating the remote command instruction to a remote command service;
   discovering one or more networked multifunction peripherals via the data interface in accordance with the remote command service and the remote command instruction; and
   communicating, via the data interface, a remote command request to each discovered multifunction peripheral, the remote command request including the received device registration code and an instruction for autonomous device registration with a print service.

9. The method of claim 8 wherein the data interface includes a network interface and a user interface, and wherein a processor is further configured to
   receive a print release from a user registered in accordance the registration code via the user interface,
   retrieve a print job associated with the user associated with the registered user, and generate a printout of the print job via associated print engine.

10. The method of claim 9 wherein the device registration code is uniquely assigned to a business entity such that the user, the multifunction peripheral and each discovered multifunction peripheral are registered to the business entity.

11. The method of claim 10 wherein the print service is comprised of one or more cloud servers.

12. The method of claim 11 further comprising synchronizing setting values with each of the discovered multifunction peripherals responsive to the remote command request.

13. The method of claim 12 wherein the remote command request includes instructions for device configuration, and further comprising:
   receiving device configuration data via the data interface;
   configuring the multifunction peripheral in accordance with received device configuration data, and
   communicating received device configuration data to each discovered multifunction peripheral.

14. The method of claim 13 further comprising selectively communicating the received device configuration data to each discovered multifunction peripheral in accordance with an administrator instruction received from an associated administrator via the data interface.

15. A method implement by a processor of a multifunction peripheral comprising:
   receiving a device registration code into a memory of the first multifunction peripheral;
   registering the first multifunction peripheral with a cloud service in accordance with the received device registration code;
   discovering at least a second multifunction peripheral on a network;
   sending a remote command request from the first multifunction peripheral to each discovered multifunction peripheral, the remote command request including a registration instruction and the device registration code; and
   executing the remote command request on the each discovered multifunction peripheral wherein the each discovered multifunction peripheral is registered with the cloud service in accordance with the device registration code.

16. The method of claim 15 further comprising:
   receiving a sync instruction into the memory of the first multifunction peripheral;
   sending the remote command request including the sync instruction;
   executing the sync instruction on the first multifunction peripheral; and
   executing the remote command request on each discovered multifunction peripheral to execute the sync instruction thereon.

17. The method of claim 15 further comprising:
   receiving user login credentials on a user selected multifunction peripheral comprising the first multifunction peripheral or a discovered multifunction peripheral;
   verifying that a user associated with a user login credentials is associated with the device registration code; and
   when the user is verified as being associated with the device registration code,
      receiving a print job associated with the user from the cloud service into the user selected multifunction peripheral, and
      printing the received print job on the user selected multifunction peripheral.

18. The method of claim 16 wherein the remote command request is executed by a remote command service on each discovered multifunction peripheral.

19. The method of claim 18 wherein the device registration code is received from an associated administrator from via a web-based job and device management tool resident on the first multifunction peripheral.

20. The method of claim 15 wherein the remote command request is sent to each discovered multifunction peripheral from a remote command service on the first multifunction peripheral.

* * * * *